US011503040B2

(12) United States Patent
Badro et al.

(10) Patent No.: US 11,503,040 B2
(45) Date of Patent: *Nov. 15, 2022

(54) DISTRIBUTED CONTENT UPLOADING AND VALIDATION

(71) Applicant: Comcast Cable Communications, LLC, Philadelphia, PA (US)

(72) Inventors: Joseph Badro, Denver, CO (US); Yasser F. Syed, La Crescenta, CA (US); Donald J. Wester, Colorado Springs, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 271 days.

This patent is subject to a terminal disclaimer.

(21) Appl. No.: 16/706,143

(22) Filed: Dec. 6, 2019

(65) Prior Publication Data
US 2020/0195659 A1     Jun. 18, 2020

Related U.S. Application Data

(63) Continuation of application No. 16/052,984, filed on Aug. 2, 2018, now Pat. No. 10,536,467, which is a (Continued)

(51) Int. Cl.
*H04N 21/8352* (2011.01)
*H04W 12/10* (2021.01)
(Continued)

(52) U.S. Cl.
CPC ............ *H04L 63/123* (2013.01); *H04L 63/08* (2013.01); *H04L 65/612* (2022.05);
(Continued)

(58) Field of Classification Search
CPC ....... H04L 63/123; H04L 63/08; H04L 67/12; H04L 65/4084; H04N 21/8352;
(Continued)

(56) References Cited

U.S. PATENT DOCUMENTS 6,460,086 B1    10/2002   Swaminathan et al.
7,120,692 B2    10/2006   Hesselink et al.
(Continued)

FOREIGN PATENT DOCUMENTS

WO    1999027676 A2    6/1999
WO    2013067122 A1    5/2013

*Primary Examiner* — Hosuk Song
(74) *Attorney, Agent, or Firm* — Banner & Witcoff, Ltd.

(57) ABSTRACT

In accordance with one or more embodiments, aspects of the disclosure provide efficient, effective, and convenient ways of uploading and authenticating content. In particular, a user device may receive validating information from a wireless networking device. The user or client device may record a content item, and may insert a validation tag based on the validating information. The user or client device may then send the content item to the wireless networking device. The wireless networking device may receive the content item at a first location and may determine the validity of the content item based on the validating information. The user device may continually interact with wireless networking devices as it travels to continually upload content items while establishing the validity of the time and location of the content items.

20 Claims, 6 Drawing Sheets

Related U.S. Application Data continuation of application No. 15/047,095, filed on Feb. 18, 2016, now Pat. No. 10,075,452.

(51) Int. Cl.

| | | |
|---|---|---|
| *H04L 9/40* | (2022.01) | |
| *H04N 21/8547* | (2011.01) | |
| *H04N 21/222* | (2011.01) | |
| *H04N 21/258* | (2011.01) | |
| *H04N 21/442* | (2011.01) | |
| *H04N 21/81* | (2011.01) | |
| *H04L 65/612* | (2022.01) | |
| *H04L 65/4061* | (2022.01) | |
| *H04W 12/61* | (2021.01) | |
| *H04W 12/63* | (2021.01) | |
| *H04W 12/68* | (2021.01) | |
| *H04L 67/52* | (2022.01) | |

(52) U.S. Cl.
CPC ......... *H04N 21/222* (2013.01); *H04N 21/258* (2013.01); *H04N 21/442* (2013.01); *H04N 21/812* (2013.01); *H04N 21/8352* (2013.01); *H04N 21/8547* (2013.01); *H04W 12/10* (2013.01); *H04L 65/4061* (2013.01); *H04L 67/52* (2022.05); *H04W 12/61* (2021.01); *H04W 12/63* (2021.01); *H04W 12/68* (2021.01)

(58) Field of Classification Search
CPC ............. H04N 21/8547; H04N 21/222; H04N 21/528; H04N 21/442; H04N 21/812; H04N 21/258; H04W 12/10
See application file for complete search history.

(56) References Cited

U.S. PATENT DOCUMENTS

| | | |
|---|---|---|
| 7,379,605 B1 | 5/2008 | Ticsa |
| 7,653,200 B2 | 1/2010 | Karmi et al. |
| 7,933,412 B2 | 4/2011 | Kugumiya et al. |
| 8,327,448 B2 | 12/2012 | Eldar et al. |
| 8,930,040 B2 | 1/2015 | Gompert et al. |
| 8,966,262 B2 | 2/2015 | Schell et al. |
| 9,053,594 B2 * | 6/2015 | Chavez ................. H04L 67/12 |
| 9,342,932 B2 | 5/2016 | Chavez et al. |
| 9,443,556 B2 * | 9/2016 | Cordell .............. H04N 21/4223 |
| 9,501,878 B2 | 11/2016 | Palmer et al. |
| 9,711,050 B2 * | 7/2017 | Ansari ................... G06Q 40/08 |
| 9,998,895 B1 * | 6/2018 | Schuler ................... H04W 4/02 |
| 10,075,452 B2 | 9/2018 | Badro et al. |
| 10,536,467 B2 * | 1/2020 | Badro .................. H04L 63/123 |
| 2002/0161909 A1 | 10/2002 | White |
| 2005/0071657 A1 | 3/2005 | Ryan |
| 2012/0131679 A1 | 5/2012 | Lu et al. |
| 2016/0291592 A1 * | 10/2016 | Matthews ............. G06T 3/0087 |
| 2017/0142023 A1 | 5/2017 | Yadav et al. |

* cited by examiner

DISTRIBUTED CONTENT UPLOADING AND VALIDATION

CROSS-REFERENCE TO RELATED APPLICATIONS

This application is a continuation of and claims priority to U.S. application Ser. No. 16/052,984 which is a continuation of and claims priority to U.S. application Ser. No. 15/047,095 (now U.S. Pat. No. 10,075,452), filed Feb. 18, 2016, and entitled "DISTRIBUTED CONTENT UPLOADING AND VALIDATION," which are incorporated herein by reference in their entirety.

BACKGROUND

Integration of computing devices, from personal computers to mobile devices, into connected local networks is becoming increasingly popular. Users of such computing devices have demanded and will continue to demand better ways of managing connected devices, including capturing information and sharing information.

Users may capture content and other data, and wish to upload it to a network. For example, a driver may capture footage related to his commute on the way to work. In another example, a car may capture information related to conditions or an accident. In an additional example, a service provider may wish to receive uploaded information and authenticate that information. There remains an ever-present need for improved ways of uploading and authenticating information.

SUMMARY

One or more aspects of the disclosure relate to computing hardware and software for transmitting, e.g., uploading, content across a distributed system of wireless device over a network, or one or more networks. Disclosed systems and methods provide for more convenient, functional, and easy-to-use ways for uploading and authenticating content.

Some environments may present difficulties for uploading content. For example, a vehicle may continually record content but not be in the range or presence of a wireless networking device long enough to upload the content. In another example, a user may wish or have a need for other features, such as to authenticate the validity of content, or to discover timing, formatting, location or other information regarding the content. By providing a system for authenticating and uploading content, a service provider may make content management simpler, cheaper, more accessible, and more valuable.

In accordance with one or more embodiments, aspects of the disclosure may provide efficient, effective, and convenient ways of uploading content. In particular, a user or client device may receive validating information from a wireless networking device. The user or client device may record or otherwise capture a content item and may associate, e.g., insert, with the content a validation tag based on the validating information. The user or client device may then send the content item to the wireless networking device. The wireless networking device may receive the content item at a first location and determine the validity of the content item based on the validating information. For example, the wireless networking device may compare a time maintained by the wireless networking device, a time reported by the user or client device, and a time inserted into the content item in order to determine if the times are consistent. In some instances, the user or client device may send multiple content items to one or more wireless networking devices. The one or more wireless networking devices may compare one or more times associated with the different content items, one or more times when the content items were uploaded to the wireless networking devices, and one or more times reported by the user or client device to determine the validity of time information (e.g., a time stamp and/or other information noting the time at which a content item is recorded and/or made) of the content item. This may help to determine that a time associated with the content item is accurate. For example, if a first content item had been uploaded to a first wireless networking device at a first time, then a second wireless networking device may check to see that a second content item is marked as having been recorded at a time after the first time and before the current time known to the second wireless networking device.

In some embodiments, a computing device may determine a path taken by data transmitted by the user or client device, or the device itself, based in part on the times and locations when the user or client device or data associated with the device was authenticated with multiple wireless networking devices. In some embodiments, the content item may be a video file, which may have validating information in a signaling field of a video file. In some embodiments, the validating information may comprise time information. Time information may be information be a time stamp, counter, reference, and/or other such information that may establish a time associated with the recording and/or creation of a content item. In some embodiments, sensor information (e.g., information from proximity sensor, lane detection sensor, video camera, audio recorder, etc.) of the user or client device may be inserted into the content item, which may be done in the field of a video file. In some embodiments, the user or client device may be a mobile device, and may be coupled to a moving device such as a vehicle. In some embodiments, the vehicle may collect information in response to an indication of an emergency situation. In some embodiments, the user or client device may receive an indication to preserve a content item until it can be uploaded.

This summary is not intended to identify critical or essential features of the disclosure, but merely to summarize certain features and variations thereof. Other details and features will be described in the sections that follow.

BRIEF DESCRIPTION OF THE DRAWINGS

Some features herein are illustrated by way of example, and not by way of limitation, in the figures of the accompanying drawings, in which like reference numerals refer to similar elements, and in which.

DETAILED DESCRIPTION

According to some aspects described herein, a system may allow for the continuous validation and transfer of information from a mobile source. This may be accomplished by uploading content items using multiple wireless networking devices from a user or client device while continually checking validating information of the user or client device and the content items.

Figure 1:
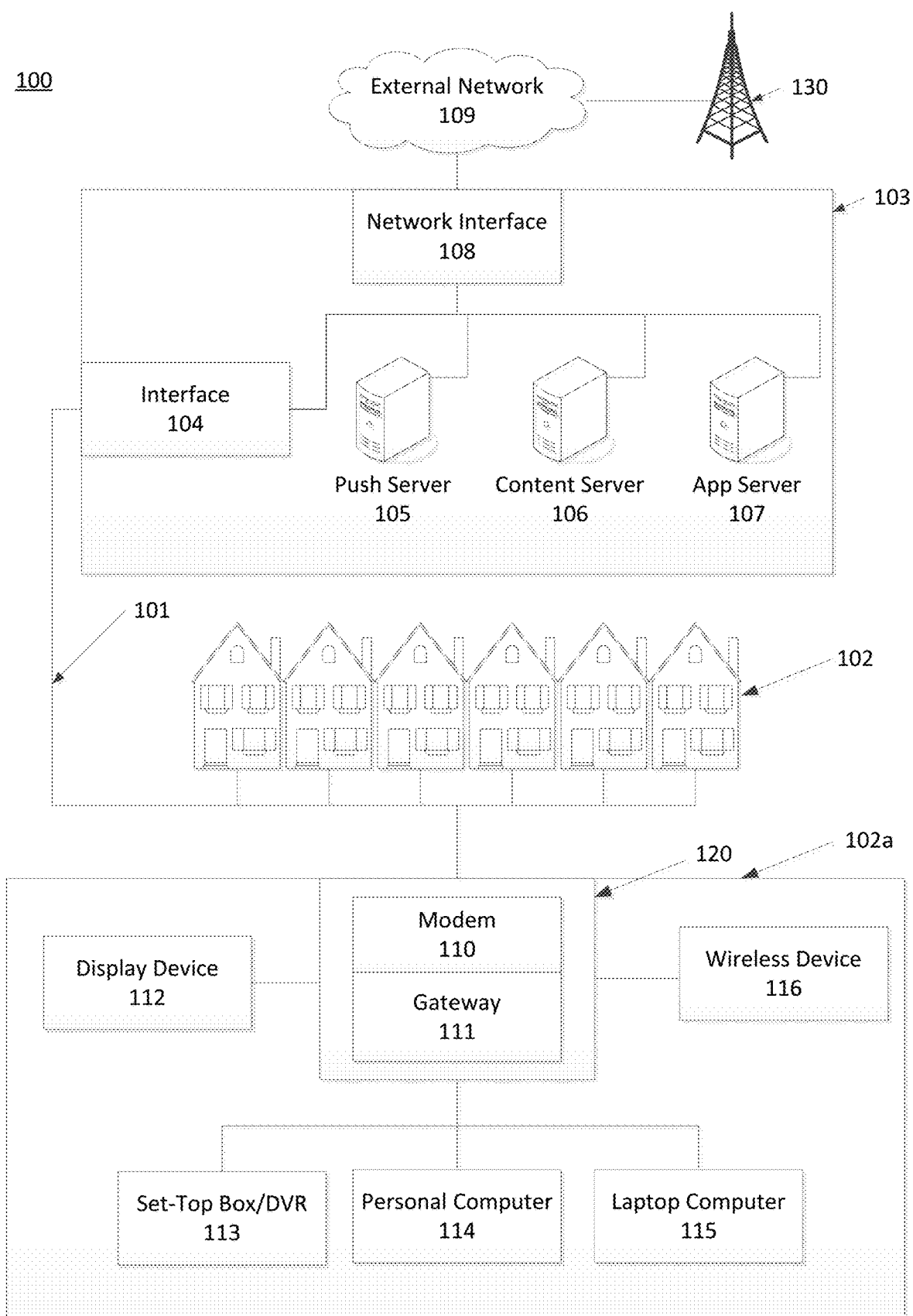
FIG. 1 depicts an illustrative network environment in which one or more aspects of the disclosure may be implemented.

FIG. 1 illustrates an example information distribution network in which one or more of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

A network 100 may be a telecommunications network, a Multi-Service Operator (MSO) network, a cable television (CATV) network, a cellular network, a wireless network, an optical fiber network, a coaxial cable network, a Hybrid Fiber-Coaxial (HFC) network, or any other type of information distribution network or combination of networks. For example, the network 100 may be a cellular broadband network communicating with multiple communications access points, such as a wireless communications tower 130. In another example, the network 100 may be a coaxial system comprising a Cable Modem Termination System (CMTS) communicating with numerous gateway interface devices (e.g., a gateway 111 in an example home 102a). In another example, the network 100 may be a fiber-optic system comprising optical fibers extending from an Optical Line Terminal (OLT) to numerous Optical Network Terminals (ONTs) communicatively coupled with various gateway interface devices. In another example, the network 100 may be a Digital Subscriber Line (DSL) system that includes a local office 103 communicating with numerous gateway interface devices. In another example, the network 100 may be an HFC network in which Internet traffic is routed over both optical and coaxial communication paths to a gateway interface device in or near a user's home. Various aspects of the disclosure may operate on one or more of the networks described herein or any other network architectures now known or later developed.

The network 100 may use a series of interconnected communication links 101 (e.g., coaxial cables, optical fibers, wireless links, etc.) to connect a premises 102 (e.g., a home or other user environment) to the local office 103. The communication links 101 may include any wired communication links, wireless communication links, communications networks, or combinations thereof. For example, portions of the communication links 101 may be implemented with fiber-optic cable, while other portions of the communication links 101 may be implemented with coaxial cable. The communication links 101 may also include various communications components such as splitters, filters, amplifiers, wireless components, and other components for communicating data.

The local office 103 may include an interface 104, which may be a computing device configured to manage communications between devices on the network of the communication links 101 and backend devices, such as a server. For example, the interface 104 may be a CMTS. The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in the premises 102, and to receive upstream communications from those modems on one or more upstream frequencies.

The local office 103 may include one or more network interfaces 108 for communicating with one or more external networks 109. The local office 103 may include a variety of servers that may be configured to perform various functions. The local office 103 may include a push server 105 for generating push notifications to deliver data, instructions, or both to devices that are configured to detect such notifications. The local office 103 may include a content server 106 configured to provide content (e.g., media content) to devices. The local office 103 may also include an application server 107.

The gateway 111 may be any computing device for communicating with the modem 110 to allow one or more other devices in the example home 102a to communicate with the local office 103, the one or more external networks 109, or other devices communicatively coupled thereto. The gateway 111 may include local network interfaces to provide communication signals to client devices in or near the example home 102a, such as a television 112, a set-top box 113, a personal computer 114, a laptop computer 115, a wireless device 116 (e.g., a wireless laptop, a tablet computer, a mobile phone, a portable gaming device a vehicular computing system, a mobile computing system, a navigation system, an entertainment system in an automobile, marine vessel, aircraft, or the like), or any other device. In some instances, the gateway 111 may be a wireless hotspot, which may be configured to provide service to one household and/or other users.

Figure 2:
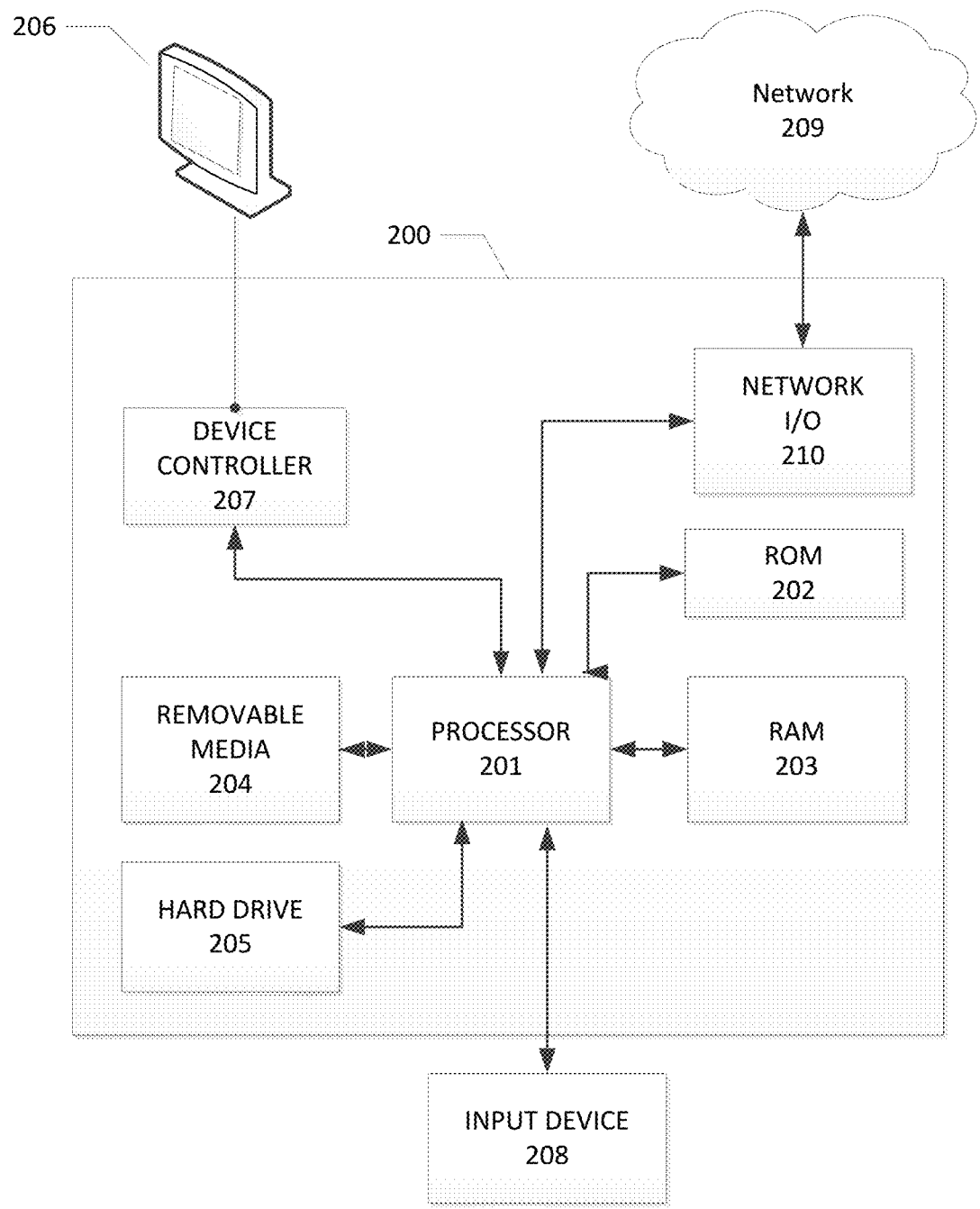
FIG. 2 depicts an illustrative software and hardware device on which various aspects of the disclosure may be implemented.

FIG. 2 illustrates general hardware elements and software elements that can be used to implement any of the various computing devices, servers, encoders, caches, and/or software discussed herein. A device 200 may include a processor 201, which may execute instructions of a computer program to perform any of the functions and steps described herein. The instructions may be stored in any type of computer-readable medium or memory to configure the operation of the processor 201. For example, instructions may be stored in a Read-Only Memory (ROM) 202, a Random Access Memory (RAM) 203, a removable media 204, such as a Universal Serial Bus (USB) drive, Compact Disk (CD) or Digital Versatile Disk (DVD), hard drive, floppy disk, or any other desired electronic storage medium. Instructions may also be stored in a hard drive 205, which may be an internal or external hard drive.

The device 200 may include one or more output devices, such as a display 206 (e.g., an integrated or external display, monitor, or television), and may include a device controller 207, such as a video processor. In some embodiments, the device 200 may include an input device 208, such as a remote control, keyboard, mouse, touch screen, microphone, motion sensing input device, and/or any other input device.

The device 200 may also include one or more network interfaces, such as a network Input/Output (I/O) interface 210 to communicate with a network 209. The network interface may be a wired interface, wireless interface, or a combination of the two. In some embodiments, the network I/O interface 210 may include a cable modem, and the network 209 may include the communication links 101 shown in FIG. 1, the one or more external networks 109, an in-home network, a provider's wireless, coaxial, fiber, or hybrid fiber/coaxial distribution system (e.g., a DOCSIS network), and/or any other desired network.

Figure 3:
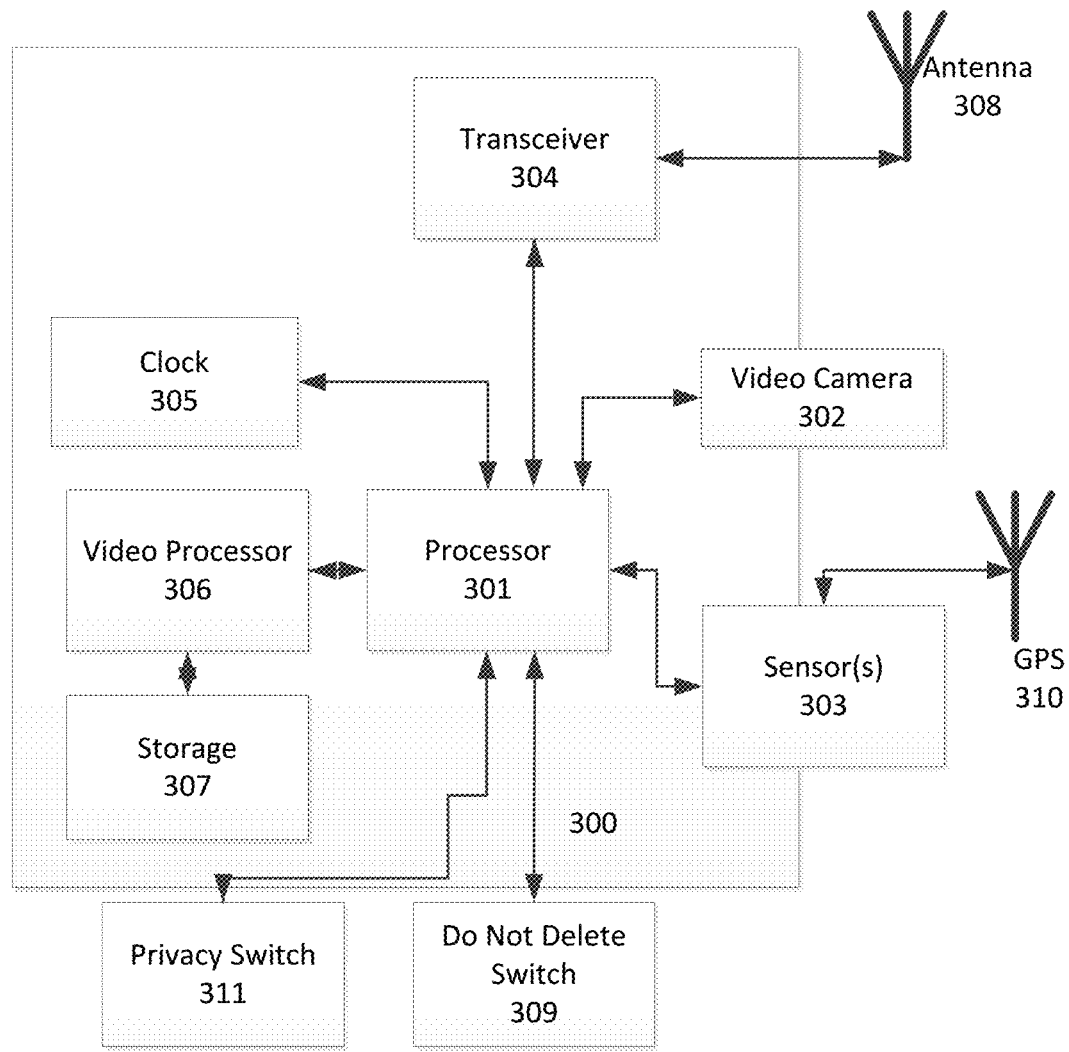
FIG. 3 depicts an illustrative example of an exemplary vehicle implementation.

Having discussed an exemplary operating environment and computing device, discussion will now turn to an illustrative example of an exemplary vehicle implementation in FIG. 3.

FIG. 3 illustrates an exemplary implementation of a system for information transmission and capture in a moving object, such as a vehicle. A moving object may be a car, boat, plane, train, bicycle or any other form of transportation suitable for the systems and/or methods described herein. For example the methods described herein may be applicable to non-motorized transportation, such as a police officer or a service representative with a device such as a radio transmitter with a camera, GPS, or other sensor. A moving object 300 may include multiple systems for capturing, storing, and/or authenticating information. A vehicle 300 may include a processor 301 for managing information. In some instances, the processor 301 may be a processor 201, and the vehicle 300 may comprise one or more devices 200.

The processor 301 may obtain information from multiple sources. In some embodiments, the processor 301 may be connected to a video camera 302. The video camera 302 may be installed as a part of the vehicle, or it may be an external device connected to the vehicle. The video camera 302 may capture video and/or audio of the vehicle and/or its surroundings. For instance, a video camera 302 may be installed in a vehicle and directed toward the driver or pilot. In one example, the video camera may capture information in the case of a crash, such as capturing the actions and statements of the pilot in the cockpit. In another example, the video camera 302 may capture video showing that a driver was texting at the time of an accident. In another instance, a video camera may be directed towards the surroundings. For example, an automobile may have multiple cameras oriented in different directions. These cameras may capture video feeds of the vehicle's surroundings, which may record what happens in a collision. For example, multiple camera feeds may be oriented in different directions, which may provide multiple viewpoints (e.g., front, side, back) from the vehicle and/or inside the vehicle.

In some embodiments, one or more sensors 303 may be connected to the processor 301. The sensors 303 may collect information about the vehicle. For example, the sensors may collect the speed of the vehicle, the status of the engine, whether seat belts are fastened, air bag deployment, information from crash assistance systems (such as LIDAR, lane departure sensors, etc.), GPS information from a GPS 310, and/or any other information available to the vehicle.

A clock 305 may be connected to the processor 301. The clock 305 may provide the processor with the current date and time. This information may be updated and/or verified according to one or more methods described herein.

The processor 301 may store video and/or sensor information in storage 307. The storage 307 may be any form of electronic storage, such as non-transitory memory. A video processor 306 may be used to process the information prior to storing the information in storage 307. For example, the video processor 306 may store sensor information in the video file. In one example, sensor information may be stored in a field of a video file. For example, sensor information may be stored in an adaptation field, which may be, for example, a standard transport stream adaptation field, or may be, for example, a non-standard adaptation field modified to be larger and/or more convenient for the methods described herein. In another example, the video processor 306 may adjust the bitrate of the video file to be stored. For example, the video processor 306 could perform compression on a video file in order to create a video file with lower size and quality. In another example, the video processor 306 may produce a plurality of video files of different bitrates and/or quality for different adaptive streaming scenarios.

A variety of information may be stored. For example, storage 307 may store information including an account number of a user, an encrypted time, vehicle sensor data, location information, and/or other information. In some instances, the information could be encrypted, such as by using a public/private key, hash function, or password. The information may be stored in limited amounts but be embedded in a video frame. For example, information could be stored in the adaptation field of an MPEG file. In some instances, the adaptation field may be a limited number of bytes embedded within information associated with particular frames of a video file. This may have the advantage of relating the stored information to the particular frames of the recorded video.

A transceiver 304 and antenna 308 may be used to communicate information between the processor 301 and any outside network. For example, a wireless networking device, such as a wi-fi hotspot, may request information from a vehicle. The transceiver 304 may receive the request via the antenna 308, and pass it on to the processor 301. The processor 301 may then obtain information from the storage 307. The processor 301 may then transmit the information to the wireless networking device through the transceiver 304 and antenna 308.

In some embodiments, a user may be able to restrict what information is collected or stored. For instance, a user may disable the video camera 302 or the sensors 303. For example, a driver may have a "privacy switch" 311 that disables a video or other sensors or transmitters associated with the vehicle. This may disable the video camera until the switch is deactivated, and/or the switch may disable the camera for a predetermined period of time.

In some embodiments, a user may be able to prioritize what information is collected or stored. A user may desire to maintain a recent recording, such as video of a traffic accident or a drive through an important site, such as Yellowstone Park. The user may have an option for maintaining a recording even if the recording were to be deleted or overwritten, such as if the recording space were to be filled to capacity. For instance, a user may have a "do not delete switch" 309 that will prevent the deletion of the past five minutes of video collected by the video camera 302. This may prevent the content from being deleted from storage 307. Further, this may prevent the content from being deleted from a cloud storage device after the content is uploaded to a wireless networking device.

Figure 4:
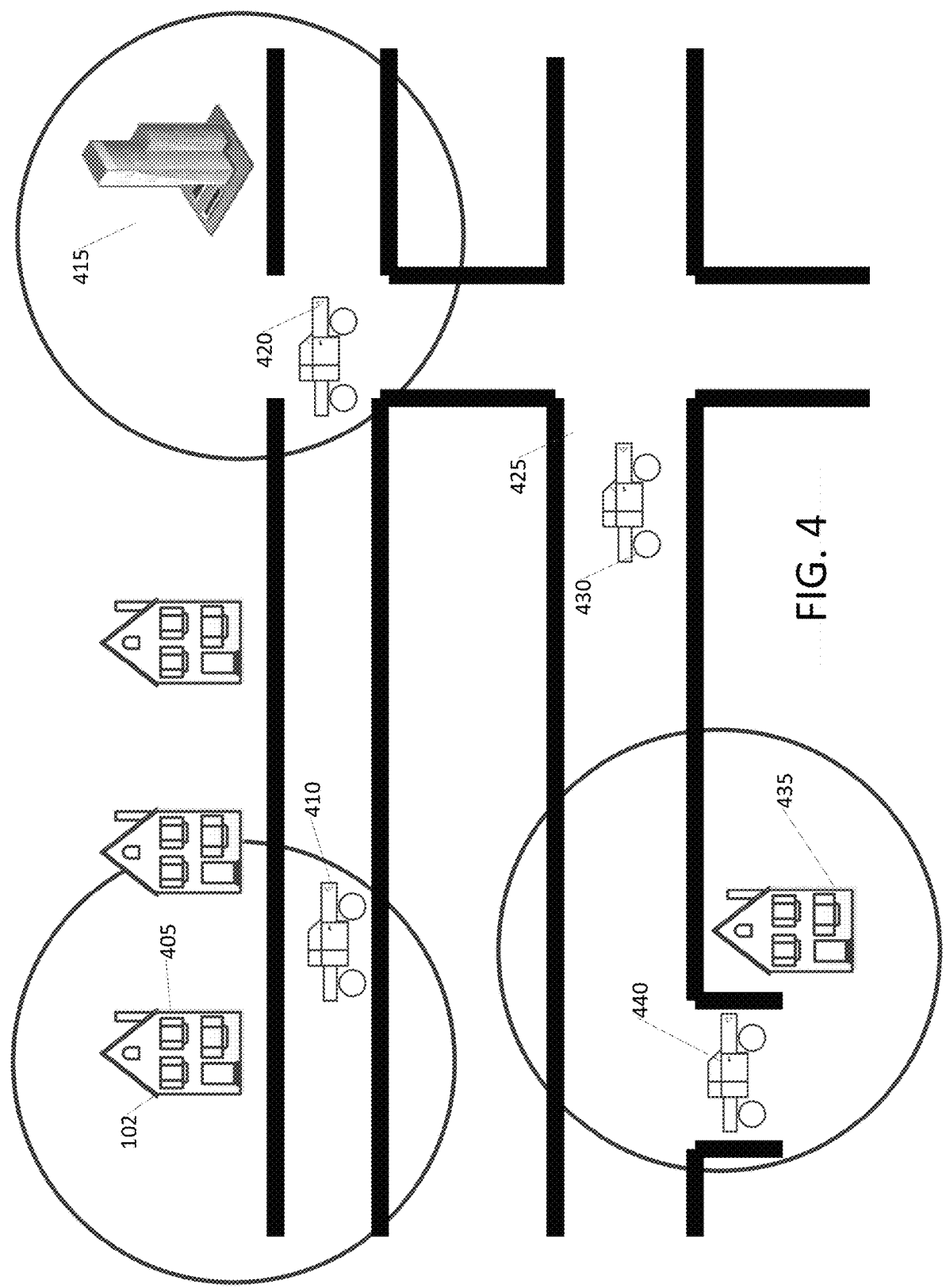
FIG. 4 depicts an exemplary environment for uploading content.

Having discussed an illustrative example of an exemplary vehicle implementation, discussion will now turn to an exemplary environment for uploading content in FIG. 4.

FIG. 4 depicts an exemplary environment for uploading content as a moving object, such as a vehicle, passes through coverage areas of multiple wireless networking devices. This figure is intended to provide an environment for understanding one or more useful features, and may apply one or more methods as described in FIG. 5, FIG. 6, and elsewhere in the specification. A vehicle in a first position 410 may be in a range of a first wireless networking device 405. In some instances, the first wireless networking device 405 may be a gateway 111 that may be located within a premises 102. In some instances, a wireless networking device may be implemented as a device 200, as shown in FIG. 2. Wireless networking devices may be implemented as other moving objects, wireless hotspots, cell towers, ad-hoc links, or any other means of wireless communication devices.

The vehicle in a first position 410, which may be similar to the mobile object 300, may receive, store, and transmit information according to one or more methods described herein. The vehicle may upload the information to the first wireless networking device 405 while it is in range of the first wireless networking device 405. The first wireless networking device 405 may validate the accuracy of and/or correct validating information of the vehicle while it is in communication with the first wireless networking device 405, or after receiving the information. The first wireless networking device 405 may also log the validation, time, and location of the vehicle.

The vehicle may reach a second position 420 and may have recorded information as it moved from the first position 410 to the second position 420. A second wireless networking device 415 located in an office building may then come into range, and begin communicating with the vehicle. The second wireless networking device 415 may validate and/or correct information sent by the vehicle. For example, the second wireless networking device 415 may perform validation as described in FIG. 5, below. Further, the vehicle may have information to upload that it captured as it passed from the first position 410 to the second position 420, e.g., information picked up from other wireless networking devices, such as access points. The vehicle may begin uploading information as soon as the second wireless networking device has validated the information. The vehicle may upload information from a buffer, uploading as much as possible while within range. The second wireless networking device 415 may be aware of the current time and location, so, in some instances, the second wireless networking device 415 may insert the current time and location into the information uploaded from the vehicle. It may log whether the validation was successful, the time of the upload, and/or the location of the vehicle. In some instances, the location of the vehicle may be based on vehicle information, such as GPS data. In other instances, the location of the vehicle may be obtained from the wireless networking device based on a configured location of the wireless networking device.

The vehicle may move to a third position 430 in an area 425 with no wireless access to a network. Because no wireless access is available, the vehicle may record information (e.g., an encrypted time, vehicle sensor data, location information, and/or other information) while using the validating information last obtained from the second wireless networking device 415. In some instances, a vehicle may record content in response to a trigger. For example, the vehicle may be involved in, or record date related to, a collision in the area 425. The vehicle may have sensors that detected the impact and a video camera that recorded the collision. The vehicle may insert the sensor information into the video file and store it in storage 307, awaiting an opportunity to upload the information to a network.

The vehicle may move to a fourth position 440 near a third wireless networking device 435. The third wireless networking device may be located at the home of the user and/or driver of the vehicle. The third wireless networking device 435 may validate and/or correct information sent by the vehicle. For example, the third wireless networking device 435 may perform validation as described in FIG. 5, below. The vehicle may upload content that did not finish uploading at the second position 420, upload the content from a collision at the third position 430, and upload content recorded between the third position 430 and the fourth position 440. In some embodiments, uploading may be limited by storage capacity. For example, the vehicle may only be able to store 30 minutes of information, and it may have been an hour since the vehicle was last connected to a network at the second position 420. The vehicle may choose to keep the content from a collision at the third position 430, and otherwise only keep the most recent content recorded between the third position 430 and the fourth position 440 (continually discarding old content in favor of new content). The retained content would be uploaded to the third networking device 435.

Location information for the third position 430 may also be obtained by using the time traveled between the second position 420 and the fourth position 440 in combination with the known positions of the second position 420 and the fourth position 440. The system may know when the vehicle was at each position, and know the relative distance between the positions. The system may then approximate the location of the vehicle at the third position 430 based on the internal mapping of the area, the time traveled, and/or the starting and ending location. This may provide an approximate location of the vehicle when it is not in communication with a wireless networking device, and/or when other data (such as GPS data) is unavailable.

In some embodiments, if the vehicle is in communication with multiple wireless networking devices, triangulation may be used. The vehicle may approximate its location by calculating a synchronization delta from two or more wireless networking devices. Using an internal map, the vehicle may calculate its position by determining the time differences between the synchronization signals from the various wireless networking devices (which may be longer the farther the wireless networking device is from the vehicle).

Figure 5:
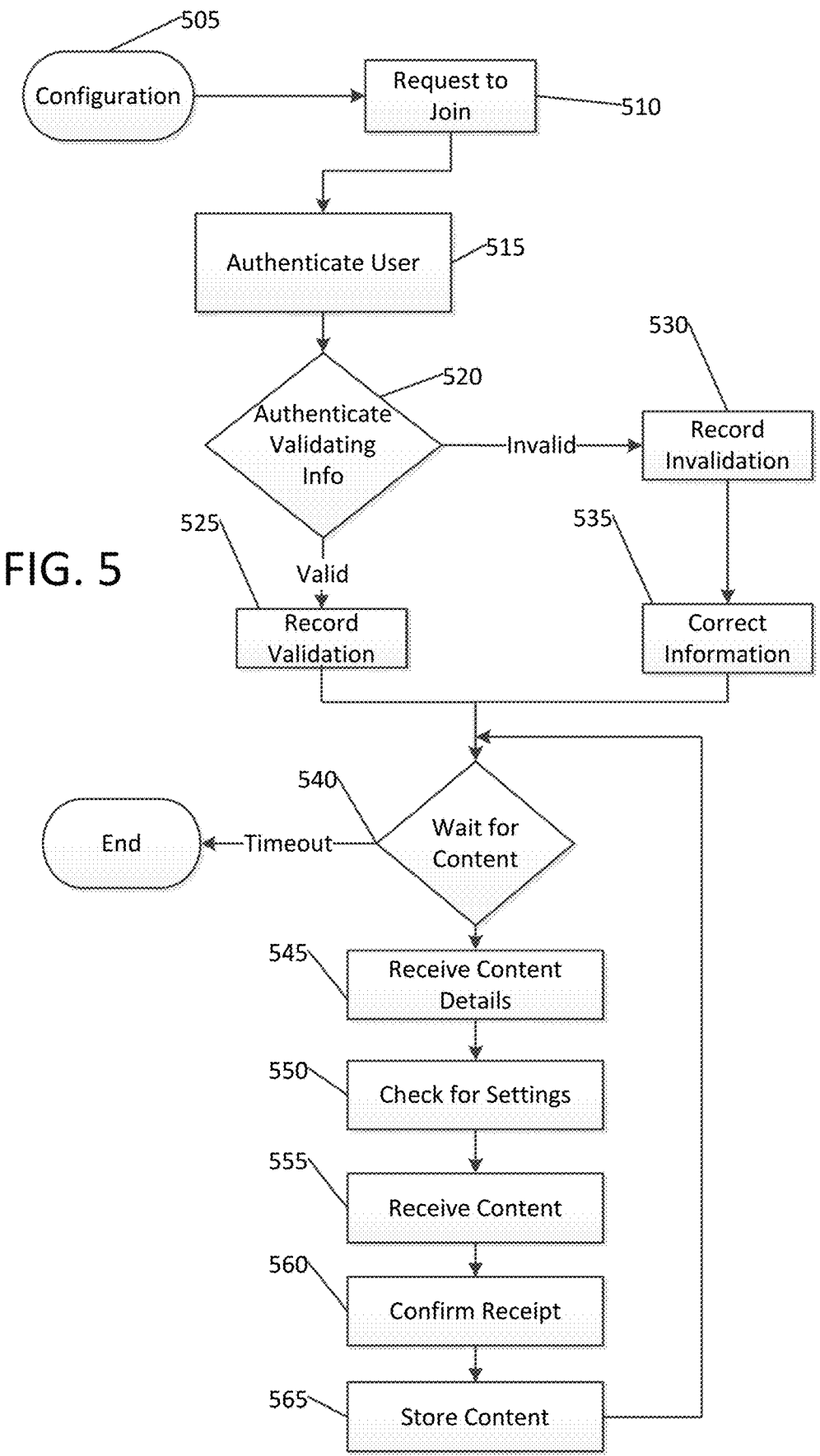
FIG. 5 depicts an illustrative method for authenticating and retrieving content.

Having discussed an exemplary environment for uploading content, discussion will now turn to an illustrative method for authenticating and retrieving content in FIG. 5.

FIG. 5 depicts an illustrative method for authenticating and retrieving content on a wireless networking device. The wireless networking device may be configured at step 505. The configuration may comprise setting up wireless access settings, establishing a time and location for the wireless networking device, establishing encryption settings, setting a network storage location for content, establishing a list of devices from which to download content, or any other such configuration useful to perform any of the steps required herein. Step 505 may be performed independent of the method of FIG. 5, such as when a network or device is initially set up or provisioned.

At step 510, the wireless networking device may receive a request to join from a user device or a client device. For example, a vehicle may have come in range of the wireless networking device and requested to join the wireless networking device's wireless network. The wireless networking device may then authenticate the device at step 515. The wireless networking device may obtain authentication information from the user or client device, such as a user name and password, a MAC address, a device ID, or any other such authentication information.

At step 520, the wireless networking device may authenticate validating information from the user or client device. In some instances, the user or client device may store or access from elsewhere the validating information. The validating information may be stored as a validation tag. The validating information may comprise time information. The validating information may also comprise other information such as an encryption key, a security token, or any other such validating information. In some instances, the wireless networking device may authenticate whether the timing information associated with data received from the user or client device matches the corresponding timing information stored by the wireless networking device. This can be performed, for example, in order to determine if tampering may have occurred.

A user or client device may have previously received synchronized timing information or data from a wireless networking device, such as through a previous iteration of the method in step 535. This time may be encrypted. For example, the time may be encrypted using keys known only to a hotspot, and/or only specific subscribers may have keys required to decrypt the time. When the user or client device previously received the synchronized timing information, it may have set an internal clock to the synchronized timing information. The user or client device may then begin incrementing its internal clock. If no tampering has occurred since the synchronized timing information was previously received, the internal clock may still match the synchronized timing information previously received by the device. However, some systems may be susceptible to tampering such that the internal clock may be altered by a user or device to indicate a time other than the synchronized timing information received from the wireless networking device.

The wireless networking device may authenticate the validating information if the current time reported by the internal clock of the user or client device matches its own time. If the times are not synchronized, it may be evidence that a user or device has tampered with the clock on the user or client device, any time information utilized by the device may not be accurate and/or based on the synchronized timing information, and the time reported on any content recorded by the user or client device cannot be trusted. In some instances, the wireless networking device may also or alternatively authenticate validating information if an encryption key of the user or client device matches the wireless networking device.

If the validating information can be authenticated, the wireless networking device may acknowledge, note, record, report, or otherwise process information related to the validation at step 525, e.g., record it in a log, before proceeding to wait for content at step 540. Otherwise, the wireless networking device may proceed to step 530.

If the validating information could not be validated, the wireless networking device may acknowledge, note, record, report, or otherwise process information related to the invalidation at step 530. This may provide a log that may indicate tampering on the user or client device. For example, the user or client device may have been tampered with to change the time setting to a week prior so that a video recording would have the wrong time stamp as part of an insurance fraud scheme. By authenticating the user or client device's validating information, the wireless networking device may identify and flag the user or client device. The flag may indicate that time stamps generated by the user or client device may have been tampered with and cannot be trusted. After recording the invalidation, the wireless networking device may correct the validating information at step 535. For example, the wireless networking device may upload a new time to the user or client device. The user or client device would then reconfigure its clock to use the new time.

At step 540, the wireless networking device may wait for data, such as content, from the user or client device. If no content is received after a certain time, the process may terminate. Otherwise, if content is received, the wireless networking device may proceed to receiving content details at step 545.

At step 545, the wireless networking device may receive details of the content to be downloaded. The details may comprise the type of information to be uploaded (audio, video, sensor data, etc.), the format (MPEG, WMV, proprietary, etc.), any special settings (such as a special storage location), or any other details that may be useful to the wireless networking device. The wireless networking device may then determine settings associated with the content at step 550, such as by consulting a database. For example, the wireless networking device may store MPEG content from a first user with an included time stamp of the download. In another example, the wireless networking device may store a WMV file by converting the WMV file into an MPEG file, embedding a time stamp, embedding the location of the download, compressing the video, and uploading the MPEG file to an external network for cloud storage.

At step 555, the wireless networking device may receive or access the content. The content may be an entire file, or it may be a piece of a file. For example, since a user or client device may be a vehicle and only in communication with the wireless networking device for a short period of time, the content may be sent in an iterative loop, with each loop sending a small segment of the file. For instance, 20 minutes of video footage may be sent as 240 blocks of 5 second video. Once content is received, the wireless networking device may confirm receipt of the content at step 560. This may allow a user or client device to know that content has been successfully uploaded before proceeding. This may have the advantage of preventing a user or client device from sending content and assuming it was successfully uploaded, when the connection was interrupted before completion.

After confirming receipt of the content, the wireless networking device may store the content at step 565, at least in part according to the settings from step 550. The wireless networking device may then return to waiting for content at step 540.

Figure 6:
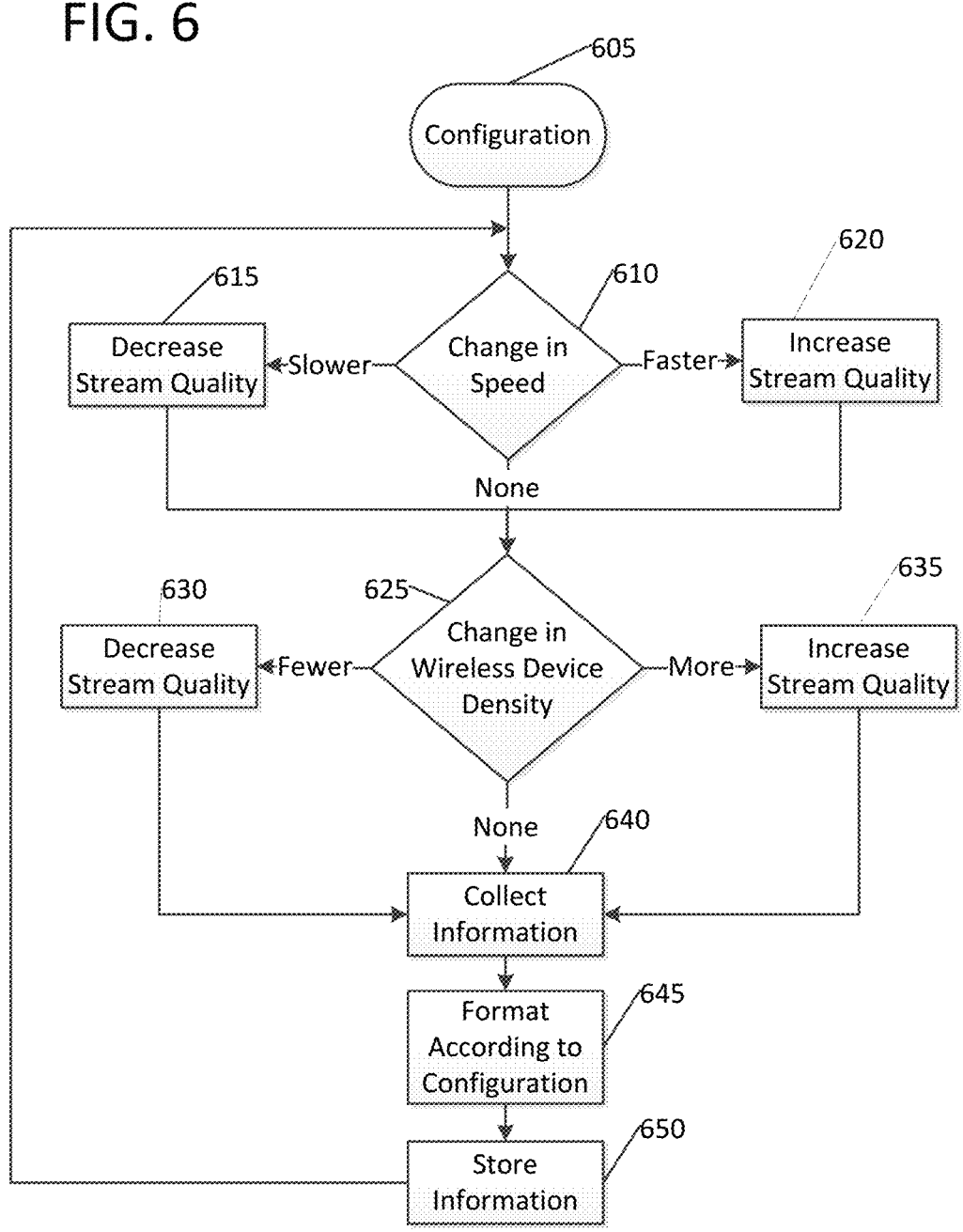
FIG. 6 depicts an illustrative method for storing content.

Having discussed an illustrative method for authenticated and retrieving content, discussion will now turn to an illustrative method for storing content in FIG. 6.

FIG. 6 depicts an illustrative method for storing content in a user or client device. User or client devices may continually store content, but may have limited storage space to hold the content. For example, a "dash camera" on a vehicle may continually record the environment around the vehicle, but storage for the recording may be limited to only a few hours. Continuously uploading content by a user or client device to wireless networking devices for storage in a remote location (e.g., on the "cloud") may alleviate storage concerns. Further, uploading content may be optimized based on environmental conditions, such as how frequently a user or client device encounters a wireless networking device for uploading, and/or how long the user or client device has to upload before going out of range of the wireless networking device. In one embodiment, the user or client device may be a moving object such as vehicle 300. At step 605, the user or client device may receive a configuration. This configuration may come from a user, a provider network, a user or client device, and/or any other suitable source. The configuration may set a time of day for the user or client device, quality and format settings for content to be stored, sensor information to be stored, how long to store information, or any other settings useful for the user or client device.

At step 610, the user or client device, which may be moving along a path, may check for a change in the speed of the user or client device. For example, a vehicle may begin moving more slowly through a city as it approaches rush hour. If no change has occurred, the user or client device may proceed to step 625. Otherwise, the user or client device may adjust streaming quality to balance the quality of a recording (with higher quality recordings being larger and thus taking longer to upload) with the availability of wireless networking devices to which it can upload. If a user or client device is traveling more slowly, the length of time between wireless networking devices may increase. Since the user or client device will have to store content between uploads, this may create a storage capacity problem. Therefore, if the user or client device is traveling faster, the user or client device may increase the quality of a stream at step 620. If a user or client device is traveling slower, the user or client device may decrease the quality of a stream at step 615. In some embodiments, adjustments to streaming quality may be implemented using adaptive bit rate (ABR) technology. After adjusting streaming quality, the user or client device may proceed to step 625.

At step 625, the user or client device may check for a change in wireless networking device density. For example, the user or client device may have moved from a rural area into an urban one, and may be encountering wireless networking devices more frequently. In another example, the user or client device may have begun using the interstate, where wireless networking devices are less frequent. If the user or client device detects an increase in the geographic density of wireless networking devices, it may increase stream quality at step 635. If the user or client device detects a decrease in the geographic density of wireless networking devices, it may decrease stream quality at step 630. In some embodiments, adjustments to streaming quality may be implemented using ABR technology. After adjusting streaming quality, or if no change in density was detected, the user or client device may proceed to step 640.

In some embodiments, multiple quality streams may be recorded simultaneously. The user or client device may select among the different quality streams for use. For example, if the wireless density decreases, the user or client device may select a lower quality stream for uploading at a hotspot. This may have the advantage of allowing streams to be uploaded quickly, while preserving high quality streams for later retrieval. For example, if the wireless density increases, the user or client device may begin uploading a higher quality version of a stream that had been previously uploaded in a lower quality.

At step 640, the user or client device may collect information. For example, a user or client device may be a vehicle outfitted with a camera for capturing video and numerous sensors capturing information in real-time. That real time information may be collected for inclusion in content. At step 645, the user or client device may format the content for uploading according to the current configuration. For example, the user or client device may use a streaming quality that is based on the default but adjusted according to the steps above. Further, sensor information may be embedded into the content, such as by inserting the information into an adaptation field of a video file. After formatting the information, the user or client device may store the information at step 650. The user or client device may then return to step 610.

In some embodiments, information obtained according to one or more methods above may be organized and/or categorized. For example, content obtained according to one or more methods as described above may result in content with time, location, and/or validation information. The content may be transmitted from the wireless networking device to a cloud and/or server environment for processing. Content may be filtered and/or grouped according to that information. For example, a motorist who is involved in an accident may filter for content taken around the time of the accident. In another example, a suspicious wife may filter content for a time period when the wife is away in order to check on the actions of a suspected cheating spouse. In another example, a rental car company may install the system in their cars, which may help assure that liability is assigned properly in the case of damage. In another example, the system may be used as an anti-theft device, as it may record a thief stealing a vehicle or where the vehicle is taken (it may even be used while the car sits at home).

In some embodiments, one or more of the above methods may be used in conjunction with post processing. Content may contain annotations or data (such as sensor data) which indicate that the content may be tied to a certain activity. For example, a video file taken of a soccer practice by a cell phone may be analyzed in order to determine if a parent's child is in the frame. Using the time and location information of the content, a system may automatically determine content that may contain soccer practice, and then perform the post-processing searching for the number of child's jersey number. The content may then be grouped for viewing by the parent. For example, the content may be sent by a push server 105 or content server 106 to a set-top box/DVR 113 leased to the parent for convenient viewing. In other instances, the system may read license plates or other text. For example, if an Amber alert is issued for a missing child, authorities may be able to quickly look for any uploaded video from a vehicle that matches the license plate of a suspected kidnapper.

The methods and features recited herein may be implemented through any number of computer readable media that are able to store computer readable instructions. Examples of computer readable media that may be used include RAM, ROM, Electrically Erasable Programmable Read-Only Memory (EEPROM), flash memory or other memory technology, CD-ROM, DVD, or other optical disk storage, magnetic cassettes, magnetic tape, magnetic storage, and the like.

Additionally or alternatively, in at least some embodiments, the methods and features recited herein may be implemented through one or more Integrated Circuits (ICs). An IC may, for example, be a microprocessor that accesses programming instructions or other data stored in a ROM. In some embodiments, a ROM may store program instructions that cause an IC to perform operations according to one or more of the methods described herein. In some embodiments, one or more of the methods described herein may be hardwired into an IC. For example, an IC may comprise an Application Specific Integrated Circuit (ASIC) having gates and/or other logic dedicated to the calculations and other operations described herein. In still other embodiments, an IC may perform some operations based on execution of programming instructions read from ROM or RAM, with other operations hardwired into gates or other logic. Further, an IC may be configured to output image data to a display buffer.

Although specific examples of carrying out the disclosure have been described, those skilled in the art will appreciate that there are numerous variations and permutations of the above-described apparatuses and methods that are contained within the spirit and scope of the disclosure as set forth in the appended claims. Additionally, numerous other embodiments, modifications, and variations within the scope and spirit of the appended claims may occur to persons of ordinary skill in the art from a review of this disclosure. Specifically, one or more of the features described herein may be combined with any or all of the other features described herein.

The various features described above are merely non-limiting examples, and may be rearranged, combined, subdivided, omitted, and/or altered in any desired manner. For example, features of the servers may be subdivided among multiple processors and/or computing devices. The true scope of this patent should only be defined by the claims that follow.

The invention claimed is:

1. A method comprising:
   storing, by a vehicle, video content;
   sending, by the vehicle and to a first wireless networking device, a first portion of the video content for storage at a computing device;
   sending, by the vehicle and to a second wireless networking device, a second portion of the video content for storage at the computing device; and
   receiving, by the vehicle and from the computing device, a copy of the video content comprising the first portion and the second portion.

2. The method of claim 1, wherein the first portion comprises validation information for validating the first portion with the computing device.

3. The method of claim 1, wherein at least one of the first wireless networking device or the second wireless networking device comprises a second vehicle.

4. The method of claim 1, further comprising:
   sending, by the vehicle and to a third wireless networking device, a third portion of the video content; and
   receiving, by the vehicle and from the computing device, a second copy of the video content that comprises the first portion, the second portion, and the third portion.

5. The method of claim 1, wherein the video content comprises video content and audio content of an interior of the vehicle.

6. The method of claim 1, further comprising receiving, by the vehicle and from the computing device, an indication of a video quality for the video content, wherein the first portion is encoded according to the video quality.

7. The method of claim 1, further comprising:
   receiving, by the vehicle, an indication of a trigger event; and
   wherein the sending the first portion comprises sending, based on the indication, the first portion.

8. A method comprising:
   determining a connection for receiving video content;
   receiving, from a first wireless networking device, a first portion of video content associated with a vehicle;
   receiving, from a second wireless networking device, a second portion of the video content associated with the vehicle; and
   generating, based on determining the connection, using the first portion, and using the second portion, a copy of the video content.

9. The method of claim 8, wherein the first portion comprises validation information, and further comprising:
   validating, based on the validation information, the first portion.

10. The method of claim 9, wherein the validating information comprises a time, and wherein a validation tag is stored in an adaptation field of the video content.

11. The method of claim 8, further comprising:
    receiving, from a third wireless networking device, a third portion of the video content; and
    wherein the generating the copy of the video content comprises generating, using the third portion, the copy of the video content.

12. The method of claim 8, wherein the first wireless networking device received the first portion from a computing device associated with the vehicle.

13. The method of claim 8, further comprising sending, to the vehicle, an indication of a video quality for the video content, wherein the first portion is encoded according to the video quality.

14. The method of claim 8, wherein the first portion of the video content includes an indication of a trigger event.

15. A method comprising:
    determining, by a vehicle and based on information indicating a trigger event, that the trigger event occurred at a first time;
    storing, by the vehicle and based on the determining that the trigger event occurred, the information with video content recorded at the first time;
    determining, by the vehicle, a wireless networking device is in range of the vehicle; and
    sending, from the vehicle to the wireless networking device and based on the determining that the trigger event occurred, the stored information with the video content.

16. The method of claim 15, wherein the trigger event comprises:
    a collision of the vehicle; or
    an emergency situation.

17. The method of claim 15, wherein the information comprises sensor data of the vehicle.

18. The method of claim 15, further comprising:
    receiving, by the vehicle and from the wireless networking device, validating information; and
    inserting, by the vehicle and into the video content, a validation tag based on the validating information.

19. The method of claim 15, wherein the storing, by the vehicle, the information with the video content comprises:
    determining storage of the vehicle is full;
    deleting, from the storage, at least a portion of old video content to allow for the storing of the information with the video content; and
    storing the information with the video content in the storage.

20. The method of claim 15, further comprising:
    determining, based on location information associated with a second vehicle, that the second vehicle was within a threshold distance of the vehicle at the first time;
    sending, based on the determining that the second vehicle was within the threshold distance, a request for second video content recorded by the second vehicle at the first time; and
    receiving, from the second vehicle and after the sending the request, the second video content.

* * * * *